(12) United States Patent
Kalthoff et al.

(10) Patent No.: US 7,031,787 B2
(45) Date of Patent: Apr. 18, 2006

(54) CHANGE MANAGEMENT

(75) Inventors: Wolfgang Kalthoff, Bad Schonborn (DE); Thomas Vogt, Römerberg (DE); Guenter Huber, Oberkirch (DE); Guido Hoeckele, Knittingen (DE); Beate Koch, Leinfelden-Echterdingen (DE)

(73) Assignee: Sap Aktiengesellschaft, (DE)

( * ) Notice: Subject to any disclaimer, the term of this patent is extended or adjusted under 35 U.S.C. 154(b) by 55 days.

(21) Appl. No.: 10/328,761

(22) Filed: Dec. 23, 2002

(65) Prior Publication Data

US 2003/0182145 A1    Sep. 25, 2003

Related U.S. Application Data

(60) Provisional application No. 60/367,397, filed on Mar. 21, 2002.

(51) Int. Cl.
*G06F 19/00* (2006.01)

(52) U.S. Cl. .................... 700/105; 700/121; 705/5

(58) Field of Classification Search ........ 700/100–107; 705/29, 400, 8–10, 1, 7; 706/904; 713/201; 709/223; 716/11
See application file for complete search history.

(56) References Cited

U.S. PATENT DOCUMENTS

| | | | | |
|---|---|---|---|---|
| 4,459,663 A * | 7/1984 | Dye | ........................ | 705/29 |
| 5,099,431 A * | 3/1992 | Natarajan | ................... | 700/105 |
| 5,191,534 A * | 3/1993 | Orr et al. | .................... | 700/105 |
| 5,311,424 A * | 5/1994 | Mukherjee et al. | ........... | 705/29 |
| 5,859,972 A | 1/1999 | Subramaniam et al. | | |
| 6,226,650 B1 | 5/2001 | Mahajan et al. | | |
| 6,236,997 B1 | 5/2001 | Bodamer et al. | | |
| 6,324,647 B1 * | 11/2001 | Bowman-Amuah | ......... | 713/201 |
| 6,480,755 B1 * | 11/2002 | Ootani et al. | ............... | 700/105 |
| 6,711,456 B1 * | 3/2004 | Yokomori et al. | .......... | 700/169 |
| 6,738,682 B1 * | 5/2004 | Pasadyn | .................... | 700/100 |
| 6,754,666 B1 | 6/2004 | Brookler et al. | | |
| 2002/0087510 A1 | 7/2002 | Weinberg et al. | | |
| 2002/0116417 A1 | 8/2002 | Weinberg et al. | | |
| 2002/0194196 A1 | 12/2002 | Weinberg et al. | | |
| 2003/0233347 A1 | 12/2003 | Weinberg et al. | | |
| 2005/0038551 A1 * | 2/2005 | Mazumder et al. | ......... | 700/166 |

FOREIGN PATENT DOCUMENTS

| | | |
|---|---|---|
| CA | 2391829 | 6/2001 |
| WO | WO 01/37097 | 5/2001 |
| WO | WO 02/25471 | 3/2002 |
| WO | WO 02/25500 | 3/2002 |
| WO | WO 02/47463 | 6/2002 |

OTHER PUBLICATIONS

Bertino, Elisa, et al., "Data Security," Proceedings of the Twenty-Second Annual International Computer Software and Applications Conference, Vienna, Austria, Aug. 19-21, 1998, Los Alamitos, CA, USA, Aug. 19, 1998, (CompSAC '98), XP010305455, pp. 228-237.

(Continued)

*Primary Examiner*—Kidest Bahta
(74) *Attorney, Agent, or Firm*—Fish & Richardson P.C.

(57) ABSTRACT

Methods and apparatus, including computer program products, for managing change. The technique includes changing an object of a product creation process and accumulating the change without changing a baseline of a product structure associated with the product creation system if the change to the object is a soft change.

38 Claims, 8 Drawing Sheets

OTHER PUBLICATIONS

Bon, M., et al., "Sharing Product Data Among Heterogeneous Workflow Environment," CAD 2002: Corporate Engineering Research, Geman Informatics Society, Mar. 4-5, 2002, Dresden, Germany, XP002268575, pp. 1-10.

Chandramouli, Ramaswamy, "Application of XML Tools for Enterprise-Wide RBAC Implementation Tasks," Proceedings of the 5th ACM Workshop on Role-Based Access Control, Berlin, Germany, Jul. 26-27, 2000, XP000958089, pp. 11-18.

Choi, Jin Oh et al., "Update Propagation of Replicated Data in Distributed Spatial Databases," Proceedings of Database and Expert Systems Applications: Tenth International Conference, Florence, Italy, Aug. 30, 1999-Sep. 2, 1999, DEXA '99 (Lecture Notes in Computer Science vol. 1677), Berlin, Germany, Springer-Verlag, Germany, XP009022583, pp. 952-963.

Chou, H-T. et al., "Versions and Change Notification in an Object-Oriented Database Systems",Proceedings of the Design Automation Conference, Anaheim, Jun. 12-15, 1988, Proceedings of the Design Automation Conference (DAC), New York, IEEE, US, vol. CONF. 25, Jun. 12, 1988, pp. 275-281, XP010013006, ISBN: 0-8186-0864-1.

Ferreira Rezende, Fernando de, et al., "A Lock Method for KBMSs Using Abstraction Relationships' Semantics," Proceedings of the International Conference on Information and Knowledge Management, CIKM, ACM, New York, NY, USA, 1994, XP002943684, pp. 112-121.

Hong, B. et al., "Modeling of Version Relationships for CAD Database", Computers and Communications Technology Toward 2000, Seoul, Aug. 25-28, 1987, Proceedings of the Region 10 Conference, (TENCON), New York, IEEE, US, vol. 1, Conf. 3, Aug. 25, 1987, pp. 142-146, XP000011783.

Kamita, T. et al., "A Database Architecture and Version Control for Group Work", System Sciences, 1994, vol. III: Information System: Decision Support and Knowledge-Based Systems, Proceedings of the Twenty-Seventh Hawaii International Conference on Wailea, HI, US, Jan. 4-7, 1994, Los Alamitos, CA, US, IEEE Comput. Soc., Jan. 4, 1994, pp. 438-447, XP010097053, ISBN: 0-8186-5070-2.

Rana, S.P. et al., "Version Support for Manufacturing Database Systems", International Conference on Industrial & Engineering Applications of Artificial Intelligence & Expert Systems, Tullahoma, IN, US, New York, US, vol. 2, Jun. 6, 1989, pp. 779-784, XP000605772.

U.S Appl. No. 09/577,268, filed May 2000, Hazi et al.

U.S. Appl. No. 09/643,207, filed Aug. 2000, Brookler et al.

U.S. Appl. No. 09/643,316, filed Aug. 2000, Brookler et al.

Haeder T. et al., "Integritaetskontrolle," Datenbanken Konzepte und Techniken Der Implementierung, 1999, pp. 397-405, XP002294581 [translation provided].

Haeder T. et al., "RX-Sperrverfahren," Datenbanken Konzepte und Techniken Der Implementierung, 1999, pp. 419-420, XP002294552 [translation provided].

Chaudhuri, Surajit, et al., "An Overview of Data Warehousing and OLAP Technology," SIGMOD Record, New York, NY, USA, vol. 26, No. 1, Mar. 1997, pp. 65-74, XP002193792, ISSN: 0163-5808.

Rahm, Erhard, et al., "Data Cleaning: Problems and Current Approaches," IEEE Bulletin of the Technical Committee on Data Engineering, vol. 23, No. 4, retrieved from the Internet Dec. 2000 at http://lips.informatrik.uni-leipzig.de:80/pub/2000-45, XP002284896, 11 pgs.

"SyncML Protocol, version 1.0," Internet Citation, Dec. 7, 2000, XP002217356, 60 pgs.

* cited by examiner

CHANGE MANAGEMENT

CROSS-REFERENCE TO RELATED APPLICATIONS

This application claims priority based on Provisional U.S. Patent Application No. 60/367,397 for MASTER DATA MANAGEMENT, filed Mar. 21, 2002, the disclosure of which is incorporated here by reference in its entirety.

BACKGROUND

The present invention relates to data processing, and more particularly, to change management in product creation processes.

An important factor in the success of businesses in the current era is the ability to flexibly react to the requirements of the market. Shorter product cycles require decreased product development times and quicker introduction to market while increased customer demands for individual solutions increases the number of variants.

Changes to initial product designs can occur at many points during the product development process. These changes are usually handled through a change management or engineering change management process. Changes can result from improved technology, changes to consumer demand, changes due to quality problems and/or changes to materials and components needed for manufacturing. Change management can be used to control changes to products, including assemblies and sub-assemblies, components and parts, raw materials, processes and sub-processes, product information and process information.

Requests for change can be transmitted from different entities in the product creation process. The different entities involved in the product creation system can include internal and external entities. For example, internal entities can include design, purchasing, marketing and sales, manufacturing, installation, customer service, and technical services. External entities can include existing and potential customers, dealers, distributors, suppliers, vendors, and regulatory organizations. The requests can be evaluated for consistency, dependence and validity. If the change is successfully evaluated, activities associated with the change and the resulting consequences can be documented, and notification of the change is sent to the various entities in the product creation process.

SUMMARY

The present invention provides methods and apparatus, including computer program products, for managing changes in a product creation process.

In general, in one aspect, the invention features methods and apparatus implementing a technique for managing change. The technique includes changing an object of a product creation process and accumulating the change without changing a baseline of a product structure associated with the product creation system if the change to the object is a soft change.

Particular implementations can include one or more of the following features. The changed object can be adopted in an entity to which the changed object is relevant. The changed object can be validated. A first baseline can be generated by accumulating information related to the product creation system and defining a second baseline by incorporating an accumulation of changed objects into the first baseline when a determined criteria is met.

In general, in one aspect, the invention features methods and apparatus implementing a technique for managing change in a product creation system. The technique includes changing one or more objects of a first baseline of a product structure in a product creation process, determining if the object changes require a baseline change, accumulating the object changes until a determined criteria is met if the object changes do not require a baseline change, and generating a second baseline, if the object changes require a baseline change or the determined criteria is met, by incorporating the object changes into the first baseline.

Particular implementations can include one or more of the following features. Information regarding the object changes can be transmitted to a central product creation module, and the object changes can be accumulated in the central product creation module. The object changes can be accumulated until a determined number of object changes have been accumulated.

The first baseline can be generated by recording one or more objects associated with a product creation system. Recording the one or more objects associated with the product creation system can include determining and saving information regarding a product to be produced by the product creation system. Determining and saving information regarding a product to be created can include determining and saving information regarding a product chosen from the group consisting of automotive products, aerospace products, consumer products, and electronics. Recording the one or more objects associated with the product creation system can include determining and saving information regarding attributes associated with a product produced by the product creation system. Determining and saving information regarding attributes can include determining and saving information regarding attributes chosen from the group consisting of components and characteristics.

Recording the one or more objects associated with the product creation system can include determining and saving information regarding one or more of a parts list and a materials list for a product to be produced by the product creation system. Recording the one or more objects associated with the product creation system can include determining and saving information regarding routings for producing a product.

Development stage information can be saved with the second baseline. The second baseline can be distributed to entities outside of an entity in which the second baseline was generated. The second baseline can be validated. Each changed object in the second baseline can be validated. A model view can be changed to reflect the second baseline.

In general, in one aspect, the invention features methods and apparatus implementing a technique for managing change. The technique includes storing master data in a first data store and accumulating soft changes in the first data store without changing a baseline of a product structure. The soft changes can be received from entities linked to the first data store.

Particular implementations can include one or more of the following features. The master data can be updated in the first data store at a determined time using the soft changes.

In general, in one aspect, the invention features methods and apparatus implementing a technique for managing change in a product creation system. The technique includes receiving a change to an object of a product structure in a product creation system, determining if the change to the object was made during a formalized phase of the product creation system, accumulating the change, if the change was not made during a formalized phase, until a determined criteria is met, and generating a new baseline of the product structure if the change to the object was made during the formalized phase or if the determined criteria is met.

Particular implementations can include one or more of the following features. Changes can be accumulated until a state where a number of decisions to be made for available options for objects in the product structure equals a predetermined number. Objects to be included in the product structure can be determined. Objects to be included in the product structure after the new baseline is generated can be determined.

In general, in one aspect, the invention features a change management tool. The change management tool includes a change accumulation module for accumulating soft changes to objects of a product structure in a product creation system until a determined criteria is met, and a baseline generator for generating a baseline for the product structure in a product creation system.

Particular implementations can include one or more of the following features. The change accumulation module can receive only changes made during a creative phase of the product creation system. The determined criteria can include a state where a number of decisions to be made for available options for objects in the product structure equals a predetermined number, a number of accumulated changes or a time related criteria.

In general, in one aspect, the invention features s system for managing change. The system can include a first data store storing information regarding a baseline of a product structure of a product creation system, a second data store and a network linking the first data store and the second data store. The second data store can store soft changes to objects of the baseline made by an entity involved in the product creation system. The network can be used to transmit the soft changes to the objects of the baseline between the second data store and the first data store.

Particular implementations can include one or more of the following features. The second data store can also store the baseline. Soft changes to the baseline can be accumulated in the first data store or the second data store.

In general, in one aspect, the invention features a system for managing change. The system includes a first data store storing master data, a second data store associated with an entity for storing soft changes to the master data and a network linking the first data store and the second data store. The network can be used to transmit the soft changes to the master data between the second data store and the first data store.

In general, in one aspect, the invention features a system for managing change. The system can include a first data store, a plurality of entities and a link between the first data store and the entities. The first data store can store master data and accumulating soft changes from the entities.

The invention can be implemented to realize one or more of the following advantages. Users within a product creation system are provided with a tool to handle hard or soft changes in a product creation process. Soft changes can be accumulated without performing a formal change management process, allowing more and faster modifications to products. Thus, there is more flexibility in the product creation process, and more variety in the products produced by the product creation process.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
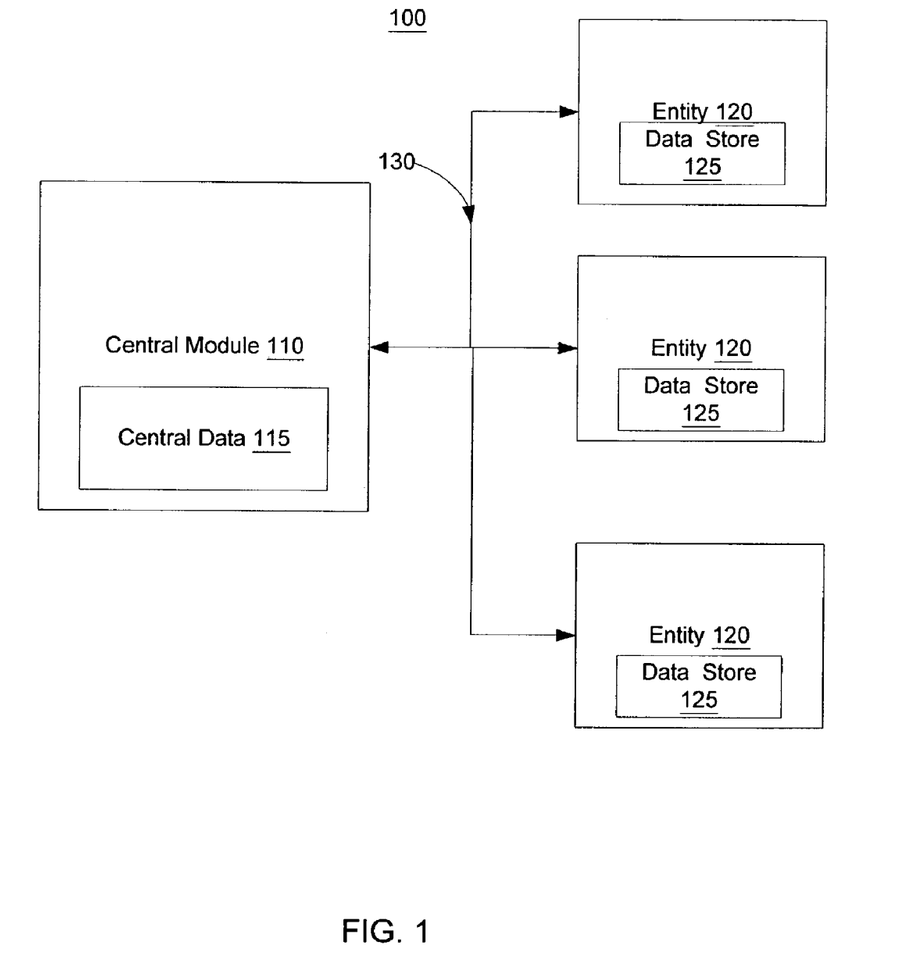
FIG. 1 is a block diagram illustrating a product creation system.

As shown in FIG. 1, a change management system can be implemented in a product creation system 100. The product creation system 100 includes a central module 110 and entity modules 120. Each of the modules 110, 120 includes a data store 115, 125.

The central module 110 represents a centralized control for a product creation process. The entity modules 120 represent entities involved in the product creation process. Many entities participate in the development of a product.

The entities can include internal and external entities. For example, entity modules 120 can include modules for design, purchasing, marketing, sales, manufacturing, installation, customer service, technical services, customers, dealers, distributors, suppliers, vendors, and regulatory organizations. The central module 110 and the entity modules 120 can communicate through a network 130.

The central module 110 includes a central data store 115 that stores master data for a product creation process. The central data can be accessed by the entity modules 120, based on permissions, or transmitted to the entity modules 120 through network 130. Each of the entity modules 120 includes a data store 125 for storing the data received from the central module 110 and for additional entity specific data developed in a respective entity module 120. For example, if the entity module 120 is a marketing module, the corresponding data store 125 could store marketing specific information. The entity specific data can be transmitted to the central data store 115, or the entity specific data can be stored only in data store 125.

Data for the product creation system can be stored in records in the data stores 115, 125. The data includes objects associated with the product creation process. The objects can include product classes, attributes, product line designs, parts lists, materials lists, routings, etc. The objects can be organized in the data store with relation to products, product lines, classes of products, etc., as described below with reference to FIG. 2 and FIG. 3.

The entity modules 120 can develop objects of the product creation system in parallel. Each entity module 120 can develop different versions of each object of the product creation process.

Figure 2:
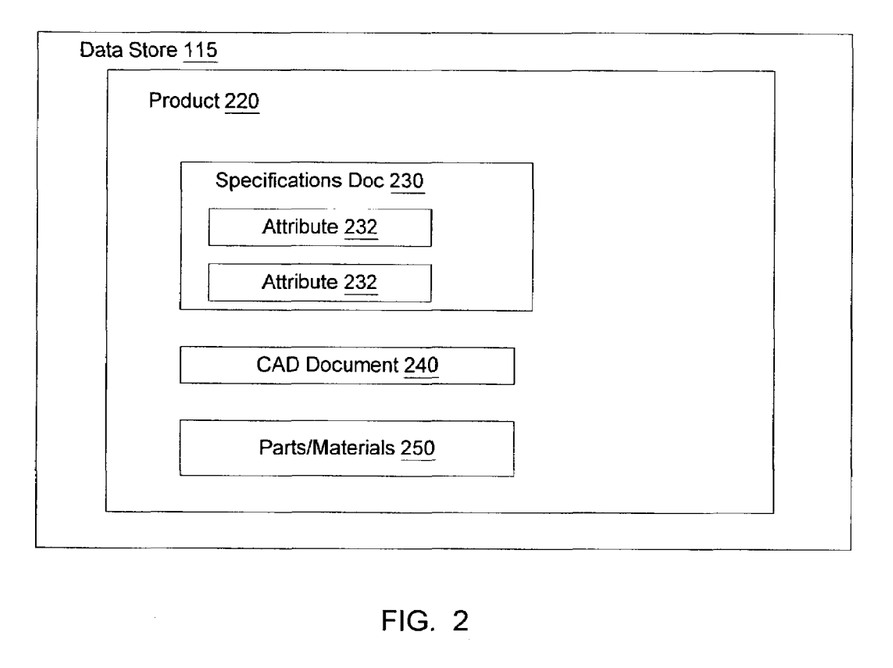
FIG. 2 is a block diagram illustrating a product record in a product creation system.

FIG. 2 is a block diagram illustrating a product structure 220 stored in a data store 115, 125. The product associated with the product structure 220 can include a specific product or a component of a product. Product structure 220 can include all objects associated with the product creation system for a product. For example, the product structure can include a variety of documents, such as a specification document 230, a computer aided design ("CAD") document 240 and a Parts/Materials document 250.

The specification document 230 can include attribute records 232. Each attribute record 322 can contain information about an attribute associated with the product. Attributes can include component information such as engine type (e.g., 95 HP, 110 HP, 125 HP, etc.) or brake type (e.g., disc or drum), or characteristics such as body color (e.g., black, silver, red, etc.) or fuel efficiency (e.g., 25 m.p.g.). Each attribute record 232 can include a value for each attribute. For example, if the attribute record 232 stores information for the attribute "engine power," the information stored in attribute record 232 can include a value of "110 HP." The contents of the attribute record(s) can be changed from within central module 110 or by any entity module 120.

Figure 3:
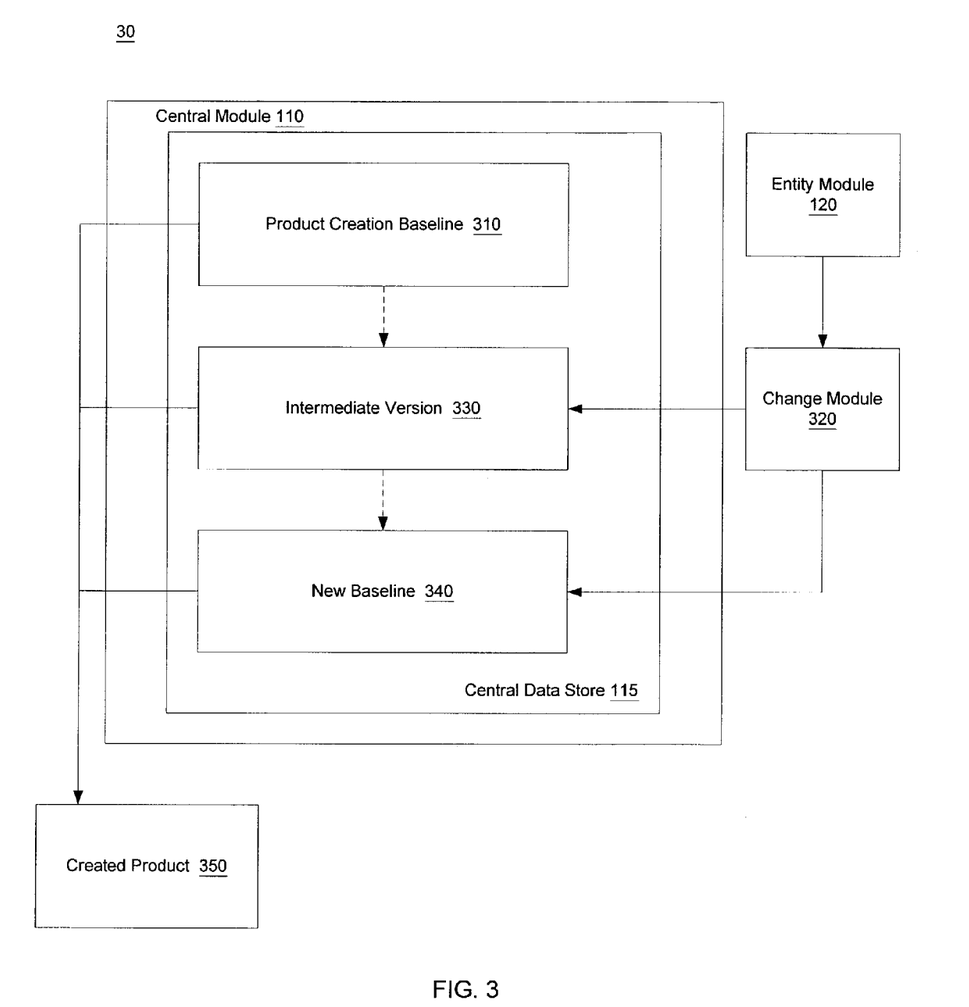
FIG. 3 is a block diagram illustrating a change management tool in the product creation system.

FIG. 3 is a block diagram illustrating a change management tool 300 in a product creation system. The change management tool 300 includes central module 310, one or more entity modules 120, change module 320 and created product module 350. The central module 110 stores a baseline 310 for a product structure in data store 115.

The change management tool 300 can be used to manage soft and/or hard changes in a product creation system. A soft change is characterized by the flexibility of the change. If a given change does not require changes to a set product structure, the change is flexible, and thus, a soft change. A soft change can include selection of an option from a series of options. For example, a structure of a car is known to have tires, and there may be fifty options available for which set of tires will be put on the car. A choice of one of the fifty options will not change the structure of a given car. Thus, the selection of a specific tire can be viewed as a soft change.

A hard change can include changes, additions or deletions to critical components of a product. A hard change requires a formal change management process and can include evaluation and approval processes.

The baseline 310 includes objects associated with the product creation project. The objects can include product(s), classes of the product(s), attributes, product line designs, parts lists, materials lists, and routings. The objects can be objects associated with product creation processes for automotive products, aerospace products, consumer products or electronics.

Baseline 310 can be modified by an informal change process to produce an intermediate structure 330 of baseline 310. Baseline 310 can also be modified by a formal change process to produce a new baseline 340. One of the baselines 310, 340 or the intermediate structure 330 will be used to produce the created product 350.

The baseline 310 can be defined by recording the objects associated with a product creation system at a point in time. The point in time can include when the product creation system is initially defined. The point in time can also include when a new baseline 340 needs to be created in response to changes to an existing baseline, as described below.

A baseline 310 of a product structure can correspond to a documented state of the structure. The baseline 310 can be a point from which further development or changes to a product structure is launched. The determination of a baseline can be a global decision encompassing the determination of which options should be included in the product structure. The decision of what to include in the baseline need not include deciding whether to include every change or option available.

In one implementation, baseline 310 can be saved with development stage information. For example, the baseline can be saved with an indication of the development stage, such as "as designed," "as built," "as maintained," etc.

The change module 320 receives changes made in entity module 120 and determines whether the changes require a new baseline. A new baseline 340 can be defined if a hard change is made to the baseline 310 by entity 120. For example, if the baseline describes an automobile, and the marketing department determines that a new motor will increase the sales of a new vehicle type, the change to the motor type can be viewed as a hard change requiring a new baseline 340. The new baseline 340 can be defined by following typical formal change management processes, including submitting a formal change request, performing a validity process, formally releasing the change and so on.

However, if the change is a soft change, the change is accumulated by the change module 320 without changing the baseline. An example of a soft change is a substitution of one part for another during manufacturing, such as substituting one shade of gray carpeting for another shade of gray carpeting. If the substitution is for carpet of the same quality and grade, the substitution will not affect other entities of the product creation process. Thus, a change resulting from a customer request during manufacturing can be processed without requiring a formal change management process. Another example of a soft change is a design change during a creative portion of a design process. Soft design changes are discussed in greater detail below.

The change to the part, such as the color of carpeting, is recorded without being submitted in a formal change request. An intermediate structure 330 can be used to capture the change. The intermediate structure 330 can include the baseline 310 plus the accumulated soft changes. The change module 320 can be located in either the entity module 120 or the central module 110, depending on design or preferences.

A formal change management process can be performed on the accumulated changes to define a new baseline 340, if established criteria are met. In one implementation, shown in FIG. 4, changes are accumulated until a determined number of changes are collected. The determined number of changes can be a predetermined number of changes, or it can be dynamically decided by a user of change management tool 300. For example, the number of changes at which a new baseline will be defined can be set at 5000. Alternatively, a user can view the number of changes accumulated and determine that enough changes, such as 5000 changes, have been accumulated and a new baseline should be defined. If the soft changes include the selection of available options from a series of options, the established criteria can include a state where the number of options on which a decision needs to be made equals a predetermined number. The predetermined number can equal zero.

If the criteria are met, formal change management processes are followed to define new baseline 340. The determined number of changes can include the number of changes made by one entity module 120 or the total number of changes made by the collection of entity modules 120.

Figure 4:
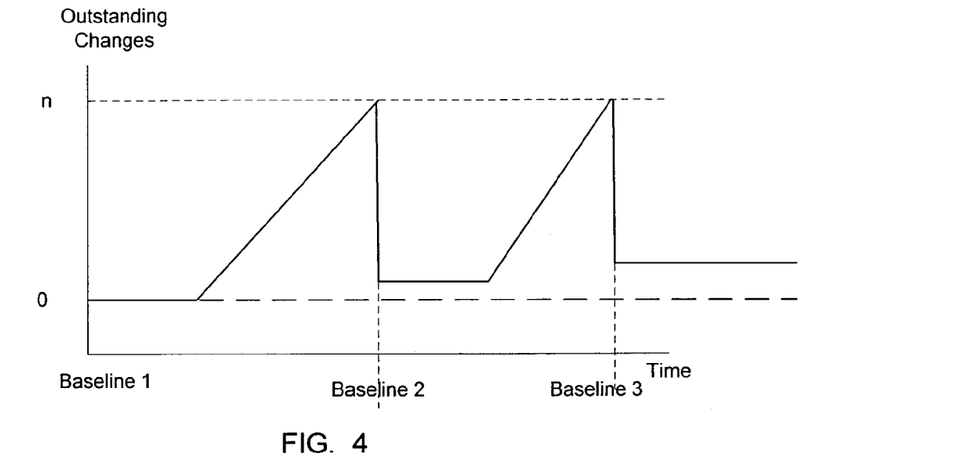
FIG. 4 is a graph illustrating a method for performing formal change management in response to meeting established criteria.

The total number of soft changes relative to the original baseline need not be resolved when a new baseline is established. For example, as shown in FIG. 4, Baseline 2 includes some outstanding changes relative to the Baseline 1, and Baseline 3 includes more outstanding changes than Baseline 1 and Baseline 2.

Figure 5:
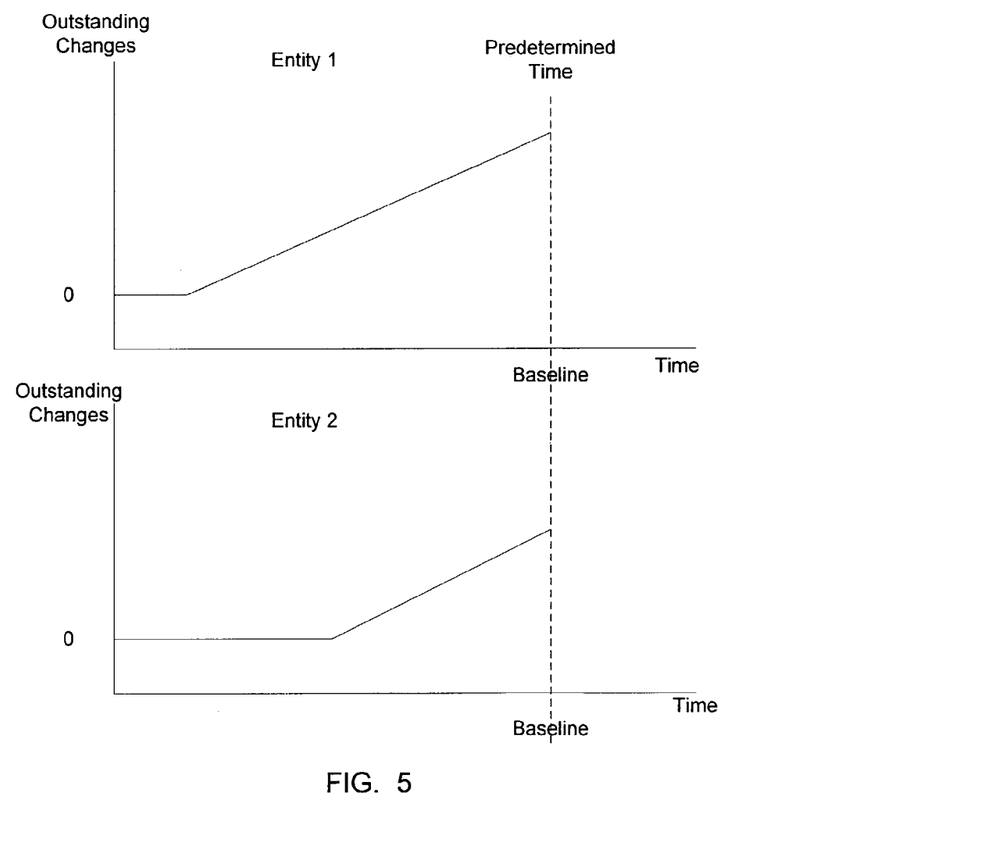
FIG. 5 is a graph illustrating an alternative method for performing formal change management in response to meeting established criteria.

In another implementation, shown in FIG. 5, changes are accumulated for a determined time period. The determined time period can be a predetermined time period, or a time defined by a user. For example, the user can decide that a long enough time has passed since the last baseline was defined, and initiate a process to define a new baseline. Thus, changes in different entity modules 120 can be collected in different versions until the end of a determined time period. Then, the collected changes can be submitted in a formal change management process to establish a new baseline 340. The determined time period can include a determined date or a determined amount of time since the last baseline 310 was defined.

Figure 6:
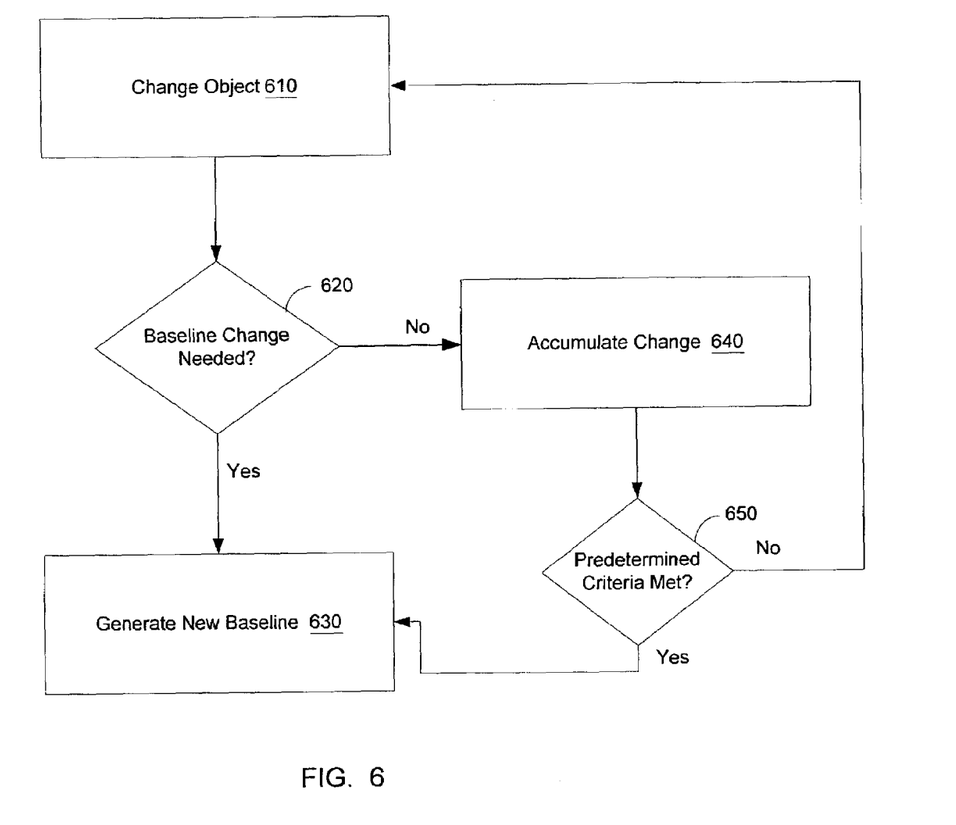
FIG. 6 is a flow diagram illustrating a method for change management in a product creation system.

FIG. 6 is a flow diagram illustrating a method for performing a change management process in a product creation system. An object of the product creation system is changed in an entity module 120. (Step 610) The change to the object is evaluated to determine if a change to a baseline 310 is required (Step 620) Changes to the baseline 310 will not be required if the change is a soft change, while a change to the baseline 310 will be required if the change is a hard change.

If a change to the baseline 310 is required, a new baseline 340 is generated. (Step 630) The new baseline 340 is generated including formal change management processes. The formal change management process can include validating the entire new baseline 340 or each changed object in the baseline. The formal change management process can also include changing one or more model views, such as CAD documents.

If a change to the baseline 310 is not required, the change is accumulated in change module 320. (step 640) Information regarding the change can be transmitted to other entity modules 120, even if a new baseline is not required. The change to the object can be adopted by an entity module 120 that is affected by the change.

The accumulated changes are examined to determine if a determined criteria has been met. (Step 650) If the determined criteria has been met a change to the baseline 310 is required, as described above in reference to FIG. 5 and FIG. 6. If the determined criteria has been met, a new baseline 340 is generated including formal change management processes. If the determined criteria has not been met, the change management process returns to step 610 to wait for another object to be changed.

Figure 7:
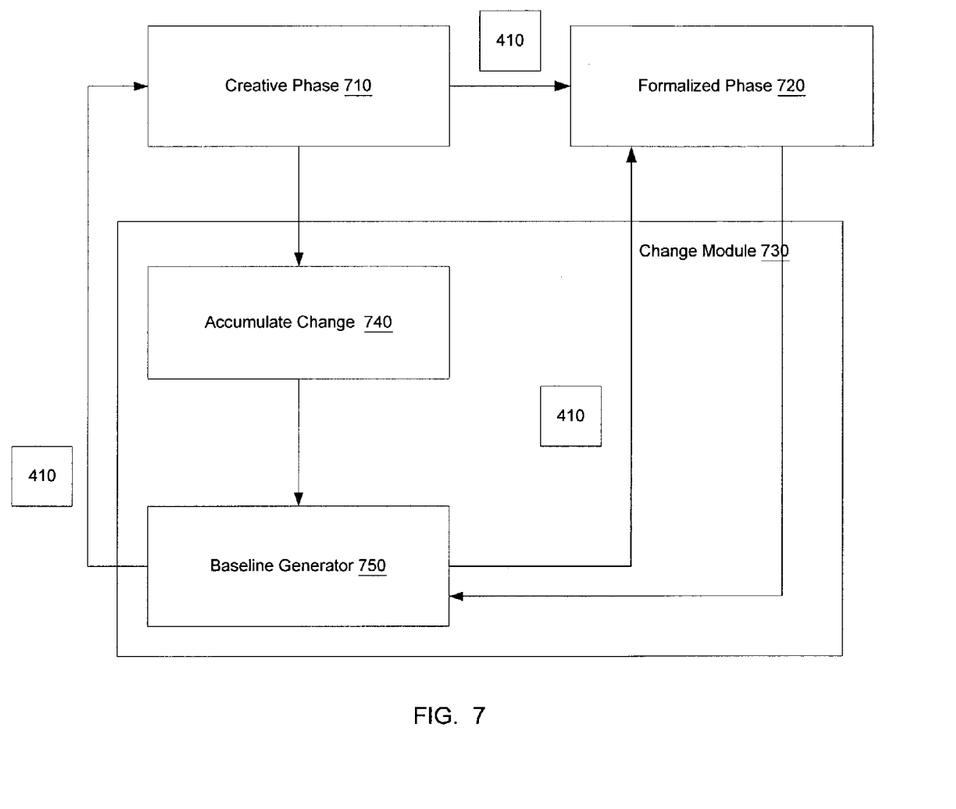
FIG. 7 is a block diagram illustrating a specific implementation of a change management tool.

In one application of the change management tool 300 and method of FIG. 6, the change management tool 300 can be applied to a product creation system in two stages, as shown in FIG. 7. The two stages can include a creative phase 710 and a formalized phase 720. During creative phase 710, a product is designed. During formalized phase 720, the product is planned and implemented. A change module 730 receives changes associated with the creative phase 710 and formalized phase 720. Change module 730 can include a change accumulation module 740 and a baseline generator 750.

In the implementation shown in FIG. 7, all changes during creative phase 710 can be defined to be soft changes, while all changes during formalized phase 720 can be defined to be hard changes.

A design process can begin, in creative phase 710, with an initial set of objects. The objects can be joined to form a design. Some or all of the objects can have available options. For example, in the design of a car, the objects can include an engine and a body. The engine can have power options available while the body can have options of different designs. Desired functionality, affect and budget of the product can act as flexible restrictions to what changes are reasonable in the mind of a designer. For example, a designer may not want to choose a 350 HP engine for a car that is to be sold for $30,000.

Because the design itself has not been formalized, changes during creative phase 710 can be made without formal change management processes. In the implementation of FIG. 7, all changes during creative phase 710 are defined as soft. Changes during creative phase 710 are accumulated in change accumulation module 740.

Thus, creative phase 710 can allow multiple options to coexist simultaneously (i.e., options exist as long as no decision among the options has been made). In creative phase 710, a soft change typically corresponds to the addition or the deletion of an available option. Because multiple design options may exist for each part anticipated to be included in the final product, the proposed design and soft changes need not be operable within the context of the product design at the time of proposal.

As design options per part are prioritized, lower priority non-operable options per part can be eliminated until the proposed design is fully operable. Changes can be submitted to baseline generator 750 as options are eliminated. Changes made in the creative phase can be evaluated in baseline generator 750 after they are made within the context of the whole proposed design. When one baseline 410 is defined, another set of options can become available as more objects are added to the design. For example, once an engine and body type are chosen, other features, such as headlights or seats, can be identified as objects of the design. Each of the newly identified features can have a series of options available. As selections of options are made for each of these objects, the selections can be submitted to change accumulation module 740 to be accumulated until the number of options for which a decision needs to be made is zero. Then, a new baseline can be generated in baseline generator 750.

During formalized phase 720, the product design has been finalized and approved, and planning and implementation of the product design occurs. The approved product design can be changed only upon receiving required authorization, thus all changes during formalized phase 720 are defined as hard changes.

The transition between the creative phase and the formalized production phase can include generating a formalized baseline. In one implementation, each version of a product existing at the time a formalized baseline is established can be defined as a separate product so that no options remain for each formalized baseline. All changes after the formalized baseline is generated can be defined to be hard changes, requiring evaluation and authorization before they are accepted. Thus, each change to the formalized baseline is submitted directly to baseline generator 750 to generate a new formalized baseline.

Figure 8:
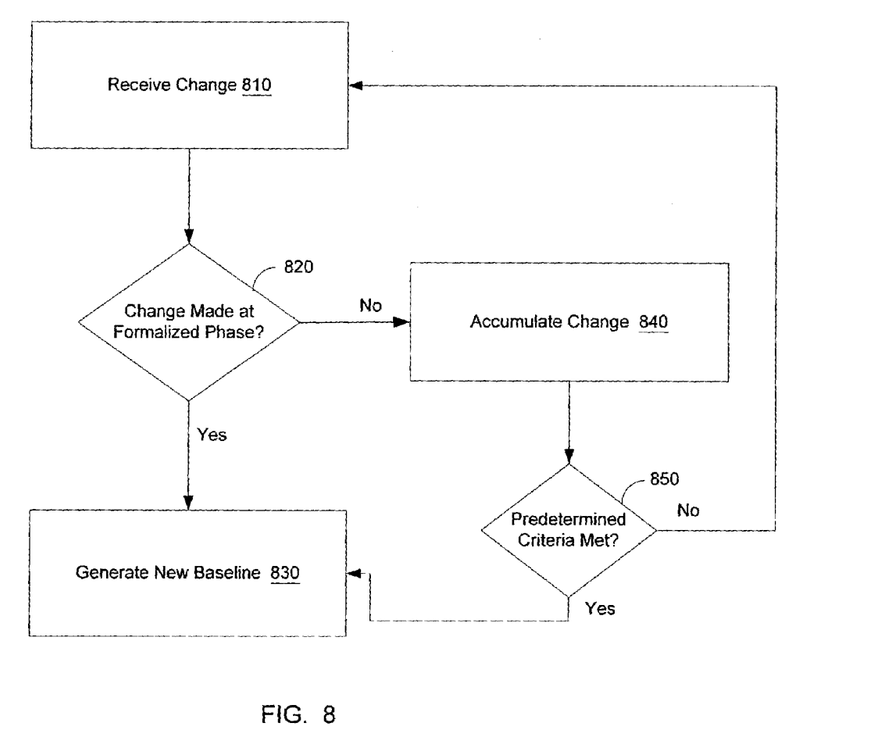
FIG. 8 is a flow diagram illustrating a specific implementation of a method for change management in a product creation system.

FIG. 8 is a flow diagram illustrating an implementation of a method of performing change management in accordance with the tool of FIG. 7. A change is received in change module 730. (Step 810) The change module determines if the change occurs in creative phase 710 or formalized phase 720. If the change occurs in formalized phase 720, a new base line is generated by baseline generator 750. (Step 830)

If the change occurs in creative phase 710, the change is accumulated in change accumulation module 740. (Step 840) As each change is accumulated in step 840, change module 730 checks if a determined criteria has been met. (Step 850) If the determined criteria has been met, the accumulated changes are submitted to baseline generator 750 for generating a new baseline. (Step 830) If the determined criteria has not been met, the change module 730 returns to step 810 to receive another change. The determined criteria can include reaching the state where the number of options that need to be decided upon for the identified objects of a product design equals zero. The determined criteria can also include accumulating a certain number of changes or a certain length of time.

Figure 9:
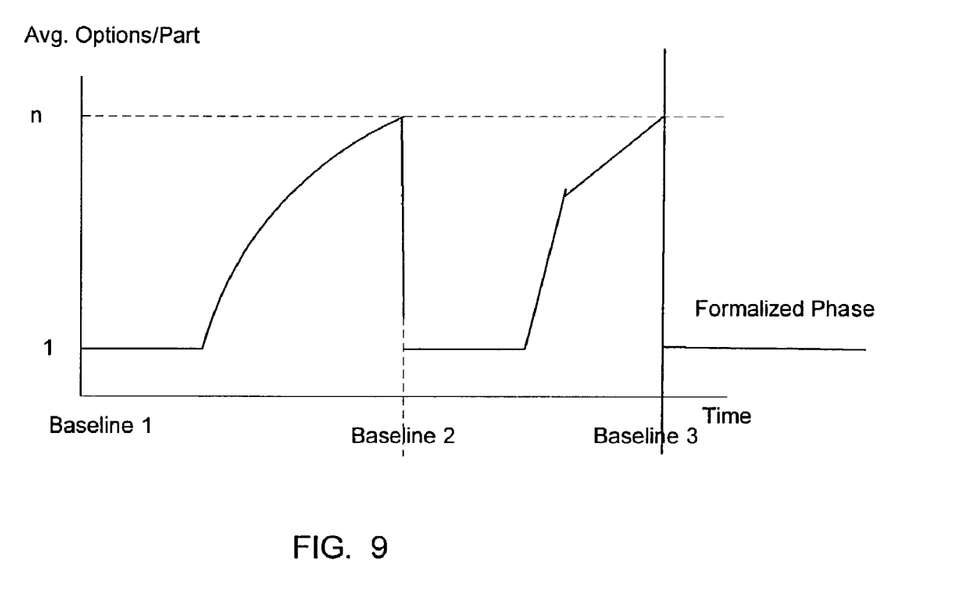
FIG. 9 is a graph illustrating the effect of using the implementation of the change management tool of FIG. 7.

FIG. 9 is a graph illustrating the effect of using the change management tool of FIG. 7. The vertical axis of the graph represents the average number of options available per part of the product, while the horizontal axis represents time. As objects are chosen, the average number of options per part increases. As decisions are made on the options available, the average number of options per part will decrease. Thus, when a baseline is established, the average number of options per part goes down to 1, representing that the available options have been decided upon for the product. For example, in a car design, the options available for the engine can include 110 HP engine, 120 HP engine, and 130 HP engine. Once a decision is made to design the car with a 120 HP engine, the other options are eliminated from the product structure.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A method of managing change in a product creation system, comprising:

changing one or more objects of a first baseline product structure in a product creation process, wherein changing produces object changes;

determining if the object changes require production of a second baseline product structure in the product creation process;

accumulating the object changes in the product creation process until a determined criteria is met if the object changes do not require the production of a second baseline product structure; and generating a second baseline product structure if the object changes require the production of a second baseline structure.

2. The method of claim 1, further comprising transmitting information regarding the object changes to a central product creation module, wherein accumulating the object changes until the determined criteria is met includes accumulating the object changes in the central product creation module.

3. The method of claim 1, wherein accumulating the object changes until the determined criteria is met includes accumulating the object changes until a determined number of object changes have been accumulated.

4. The method of claim 1, further comprising generating the first baseline product structure by recording one or more objects associated with the product creation system.

5. The method of claim 4, wherein recording the one or more objects associated with the product creation system includes determining and saving information regarding a product to be produced by the product creation system.

6. The method of claim 5, wherein determining and saving information regarding the product to be produced includes determining and saving information regarding a product chosen from a group consisting of automotive products, aerospace products, consumer products, and electronics.

7. The method of claim 4, wherein recording the one or more objects associated with the product creation system includes determining and saving information regarding attributes associated with a product produced by the product creation system.

8. The method of claim 7, wherein determining and saving information regarding attributes includes determining and saving information regarding attributes chosen from a group consisting of components and characteristics.

9. The method of claim 4, wherein recording the one or more objects associated with the product creation system includes determining and saving information regarding one or more of a parts list and a materials list for a product to be produced by the product creation system.

10. The method of claim 4, wherein recording the one or more objects associated with the product creation system includes determining and saving information regarding routings for producing a product.

11. The method of claim 1, further comprising saving development stage information with the second baseline.

12. The method of claim 1, further comprising distributing the second baseline product structure to entities outside of an entity in which the second baseline product structure was generated.

13. The method of claim 1, further comprising validating the second baseline product structure.

14. The method of claim 1, further comprising validating changed objects in the second baseline product structure.

15. The method of claim 1, further comprising changing a model view to reflect the second baseline product structure.

16. A method for managing change in a product creation system, comprising:
   receiving a change to an object of a first baseline product structure in a product creation process;
   determining if the change to the object requires production of a second baseline product structure in the product creation system;
   accumulating the change in the product creation process if the change does not require the production of a second baseline product structure, until a determined criteria is met; and
   generating a second baseline product structure if the change to the object requires the production of a second baseline product structure.

17. The method of claim 16, wherein accumulating the change until a determined criteria is met includes accumulating the change until a number of options specified for objects in the first baseline product structure equals a predetermined number.

18. The method of claim 16, further comprising determining objects to be included in the first baseline product structure.

19. The method of claim 16, further comprising determining objects to be included in the second baseline product structure.

20. A computer program product, stored on a computer-readable medium, the computer program product comprising instructions operable to cause a programmable processor to:
   change one or more objects of a first baseline product structure in a product creation process, wherein changing produces object changes;
   determine if the object changes require production of a second baseline product structure in the product creation process;
   accumulate the object changes in the product creation process until a determined criteria is met if the object changes do not require the production of a second baseline product structure; and
   generating a second baseline product structure if the object changes require the production of a second baseline product structure.

21. The computer program product of claim 20, further comprising instructions operable to cause a programmable processor to transmit information regarding the object changes to a central product creation module, wherein the instructions to accumulate the object changes until the determined criteria is met include instructions operable to cause a programmable processor to accumulate the object changes in the central product creation module.

22. The computer program product of claim 20, wherein the instructions to accumulate the object changes until the determined criteria is met include instructions operable to cause a programmable processor to accumulate the object changes until a determined number of object changes have been accumulated.

23. The computer program product of claim 20, further comprising instructions operable to cause a programmable processor to generate the first baseline product structure, the instructions to generate the first baseline product structure comprising instructions to record one or more objects associated with a product creation system.

24. The computer program product of claim 23, wherein the instructions to record the one or more objects associated with the product creation system include instructions operable to cause a programmable processor to determine and save information regarding a product to be created by the product creation process.

25. The computer program product of claim 24, wherein the instructions to determine and save information regarding the product to be created by the product creation system include instructions operable to cause a programmable processor to determine and save information regarding a product chosen from a group consisting of automotive products, aerospace products, consumer products, and electronics.

26. The computer program product of claim 23, wherein the instructions to record the one or more objects associated with the product creation system include instructions operable to cause a programmable processor to determine and save information regarding attributes associated with a product produced by the product creation process.

27. The computer program product of claim 26, wherein the instructions to determine and save information regarding attributes include instructions operable to cause a programmable processor to determine and save information regarding attributes chosen from a group consisting of components and characteristics.

28. The computer program product of claim 23, wherein the instructions to record the one or more objects associated with the product creation system include instructions operable to cause a programmable processor to determine and save information regarding one or more of a parts list and a materials list for a product to be produced by the product creation process.

29. The computer program product of claim 23, wherein the instructions to record the one or more objects associated with the product creation system include instructions operable to cause a programmable processor to determine and save information regarding routings for producing a product.

30. The computer program product of claim 20, further comprising instructions operable to cause a programmable processor to save development stage information with the second baseline product structure.

31. The computer program product of claim 20, further comprising instructions operable to cause a programmable processor to distribute the second baseline product structure to entities outside of an entity in which the second baseline product structure was generated.

32. The computer program product of claim 20, further comprising instructions operable to cause a programmable processor to validate the second baseline product structure.

33. The computer program product of claim 20, further comprising instructions operable to cause a programmable processor to validate changes to an object in the second baseline product structure.

34. The computer program product of claim 20, further comprising instructions operable to cause a programmable processor to change a model view to reflect the second baseline product structure.

35. A computer program product, stored on a computer-readable medium, the computer program product comprising instructions operable to cause a programmable processor to:

receive a change to an object of a first baseline product structure in a product creation process;

determine if the change to the object requires production of a second baseline product structure in the product creation process;

accumulate the change in the product creation process if the change does not require the production of a second baseline product structure, until a determined criteria is met; and generate a second baseline product structure if the change to the object requires the production of a second baseline product structure.

36. The computer program product of claim 35, wherein the instructions to accumulate the change until a determined criteria is met includes instructions operable to cause a programmable processor to accumulate the change a number of options specified for objects in the first baseline product structure equals a predetermined number.

37. The computer program product of claim 35, further comprising instructions operable to cause a programmable processor to determine objects to be included in the first baseline product structure.

38. The computer program product of claim 35, further comprising instructions operable to cause a programmable processor to determine objects to be included in the second baseline product structure after the new baseline is generated.

* * * * *